United States Patent [19]

Jager et al.

[11] Patent Number: 5,834,751
[45] Date of Patent: Nov. 10, 1998

[54] MOUNTING ARRANGEMENT FOR SCANNER

[75] Inventors: Jacqueline Mariëtte Jager, Rotterdam; Damian Raymond Muldoon, Amersfoort, both of Netherlands

[73] Assignee: Scantech B.V., Amersfoort, Netherlands

[21] Appl. No.: 852,454

[22] Filed: May 7, 1997

Related U.S. Application Data

[63] Continuation of Ser. No. 463,613, Jun. 5, 1995, abandoned.

[30] Foreign Application Priority Data

Jun. 8, 1994 [NL] Netherlands ............................ 9400924

[51] Int. Cl.⁶ ..................................................... G06K 7/10
[52] U.S. Cl. .......................... 235/462; 248/160; 248/161; 235/472
[58] Field of Search .................................... 235/462, 472; 248/160, 161

[56] References Cited

U.S. PATENT DOCUMENTS

| | | | |
|---|---|---|---|
| D. 325,729 | 4/1992 | Forsythe et al. ......................... | D14/107 |
| 4,802,458 | 2/1989 | Finsterwald et al. .............. | 128/661.08 |
| 5,005,669 | 4/1991 | Umebara et al. ......................... | 186/61 |
| 5,105,070 | 4/1992 | Wike, Jr. et al. ....................... | 235/467 |
| 5,198,650 | 3/1993 | Wike, Jr. ................................. | 235/472 |
| 5,216,232 | 6/1993 | Knowles et al. ........................ | 235/467 |
| 5,478,998 | 12/1995 | Charych et al. ........................ | 235/462 |

FOREIGN PATENT DOCUMENTS

| | | |
|---|---|---|
| 0 461 673 A3 | 12/1991 | European Pat. Off. . |
| 0 478 376 A3 | 4/1992 | European Pat. Off. . |
| 0 496 476 A2 | 7/1992 | European Pat. Off. . |

OTHER PUBLICATIONS

Metrologic Brochure ("MS 700 Scanner") May 18, 1990 2.

*Primary Examiner*—Donald T. Hajec
*Assistant Examiner*—Douglas X. Rodriguez
*Attorney, Agent, or Firm*—Bell, Boyd & Lloyd

[57] ABSTRACT

The present invention provides a mounting arrangement for a device for scanning and reading coded information on one or more articles. The arrangement comprises a housing in which the scanning equipment is arranged and which is provided on one side with a window for passage of scanning beams. The housing includes a bottom cover for engagement with a base surface or with a foot part via a coupler for pivoting the housing towards and away from the user of the device.

13 Claims, 5 Drawing Sheets

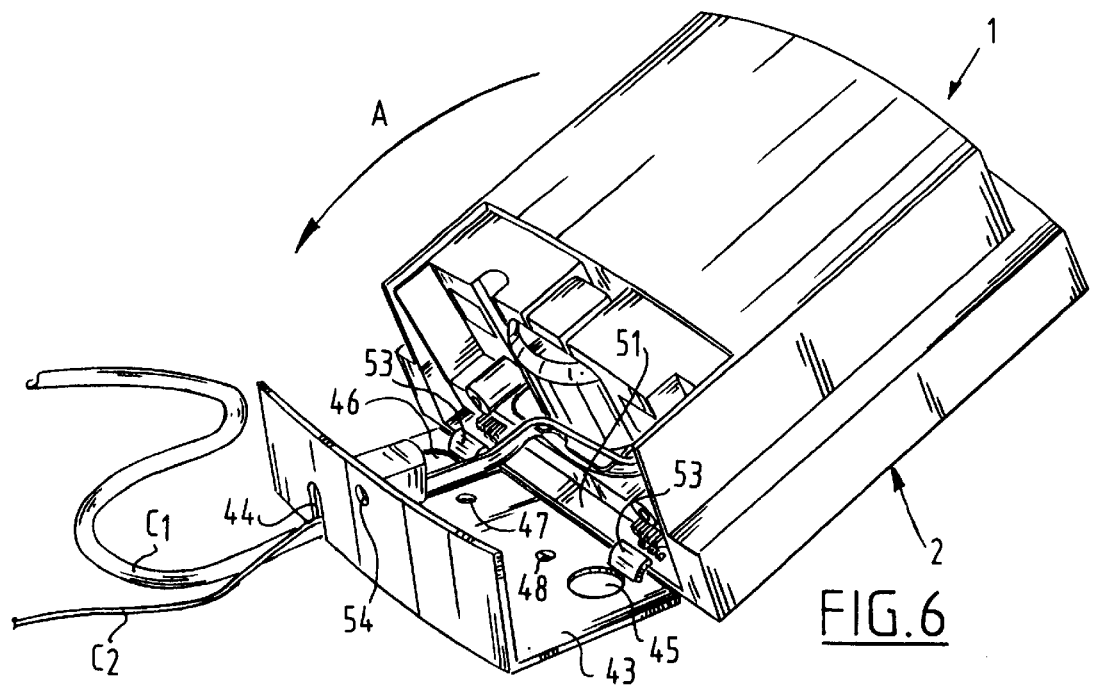
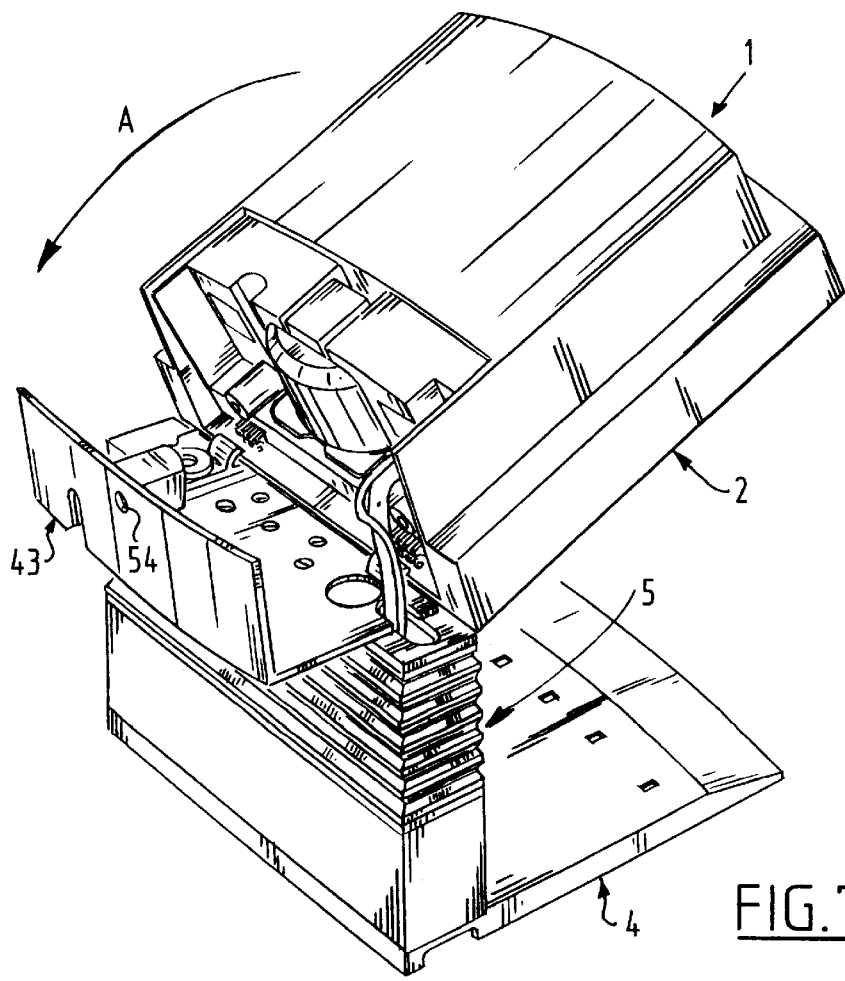

MOUNTING ARRANGEMENT FOR SCANNER

This application is a continuation of application No. 08/463,613, filed Jun. 5, 1995, now abandoned.

BACKGROUND OF THE INVENTION

1. Field of the Invention

So-called scanners are used to an increasing extent to read information the form of a bar code on articles in supermarkets and the like. Such scanners are usually disposed in upright position close to a cash point or in one plane (flush) with a table or counter along which the articles are guided.

2. Description of the Invention

EP-A-0478376 discloses an optical scanner including a housing assembly rotatedly mounted on a support member.

EP-A-0496476 discloses a mechanical joint for symbol code scanners for varying the relative position of the scanner and the processing device.

It is an object of the present invention to provide a compact scanner, for instance for less frequent use than in a supermarket, such as on the premises of dispensing chemists and the like, wherein the scanner can easily be incorporated into an existing environment and wherein modification to this environment is avoided.

The present invention provides a device for scanning and reading coded information on one or more articles, comprising a housing in which the scanning equipment is arranged and which is provided on one side with a window for passage of scanning beams, the housing including a bottom cover for engagement with a base surface or with a foot part via coupling means for pivoting the housing towards and away from the user of the device.

Contrary to the above mentioned prior art scanners, the device according to the present invention can be installed on a table or counter either with or without coupling means for pivoting or swivelling the housing towards and away from the user of the device.

BRIEF DESCRIPTION OF THE DRAWINGS

Further advantages, features and details of the present invention will become apparent in the light of the following description with reference to the attached drawings, in which:

FIG. 6 shows a perspective view of an upper pat of the scanning housing of the device shown in FIG. 1 in a first detached position according to the present invention; and FIG. 7 shows a perspective view of the overall device showing in FIG. 1 according to the present invention with the upper part of the scanner housing in the first detached position.

DESCRIPTION OF THE PREFERRED EMBODIMENTS

Figure 1:
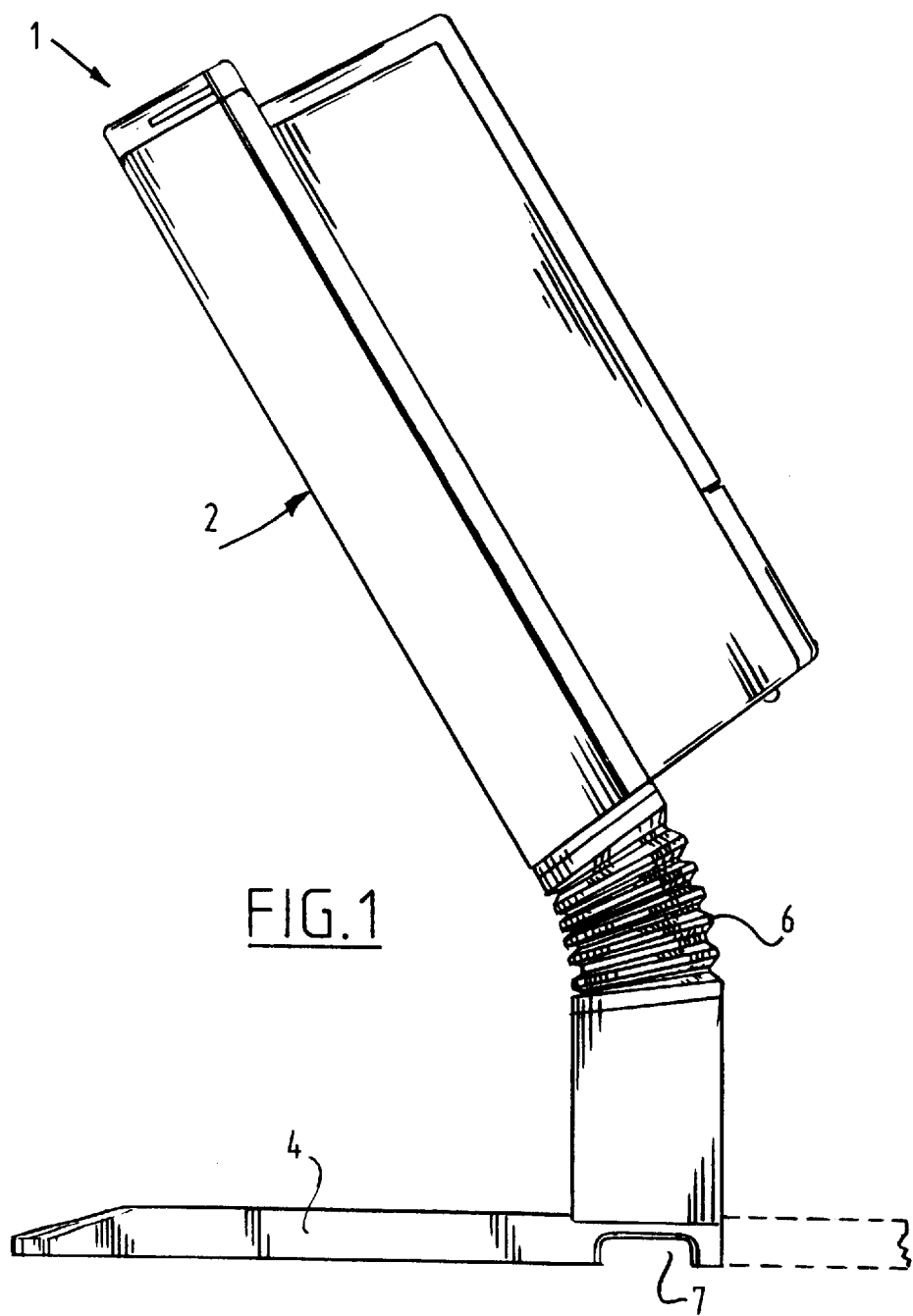
FIG. 1 shows a side view of a first preferred embodiment of the device according to the present invention in a first position.
Figure 2:
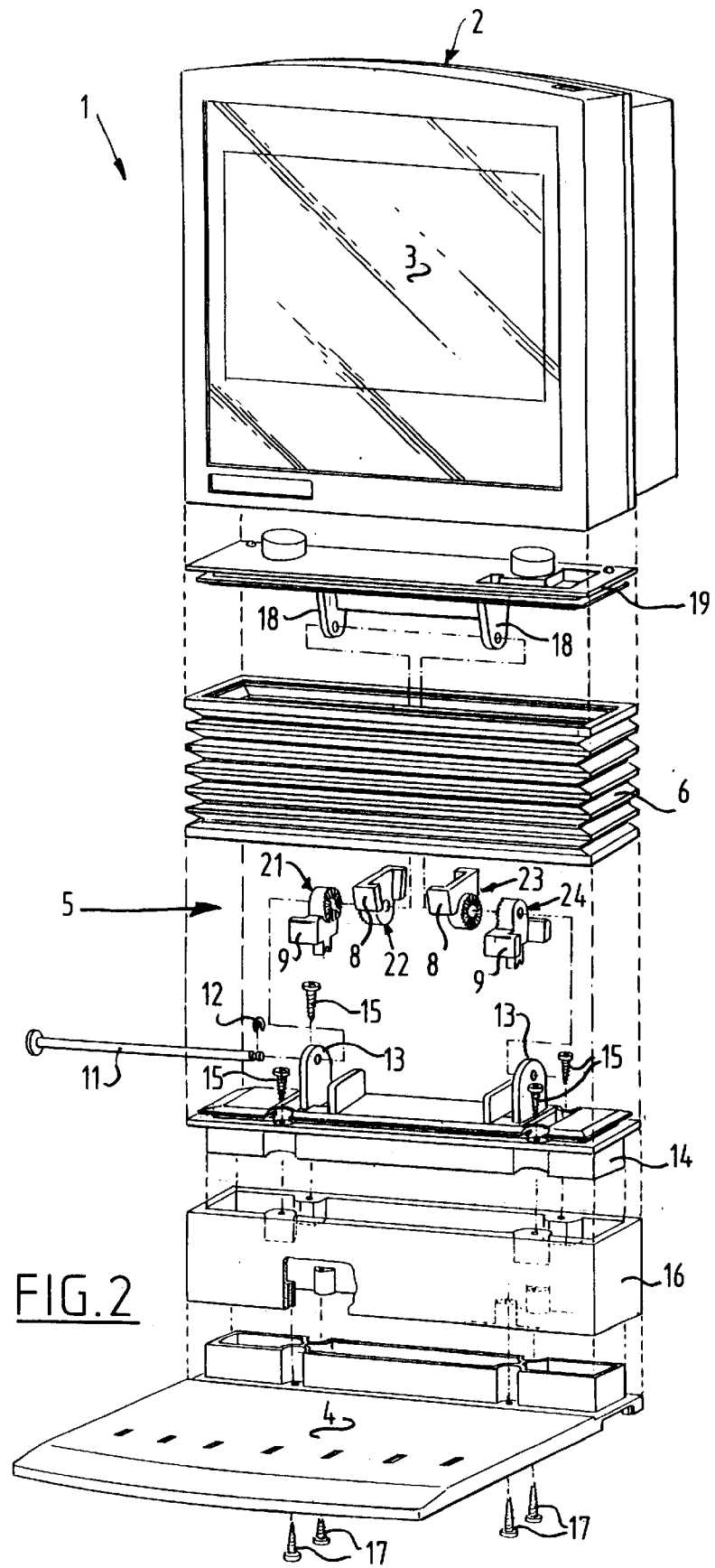
FIG. 2 shows an exploded view in perspective of the device of FIG. 1.
Figure 4:
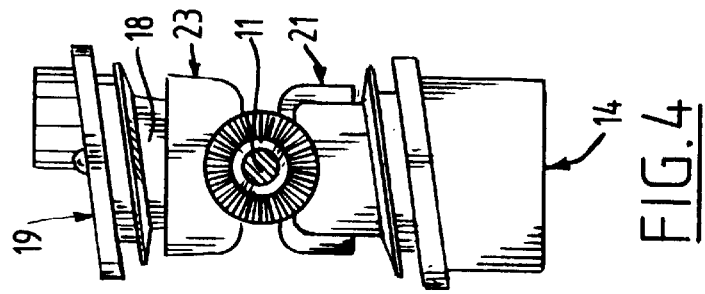
FIG. 4 is a view along the line IV—IV in FIG. 3.
Figure 3:
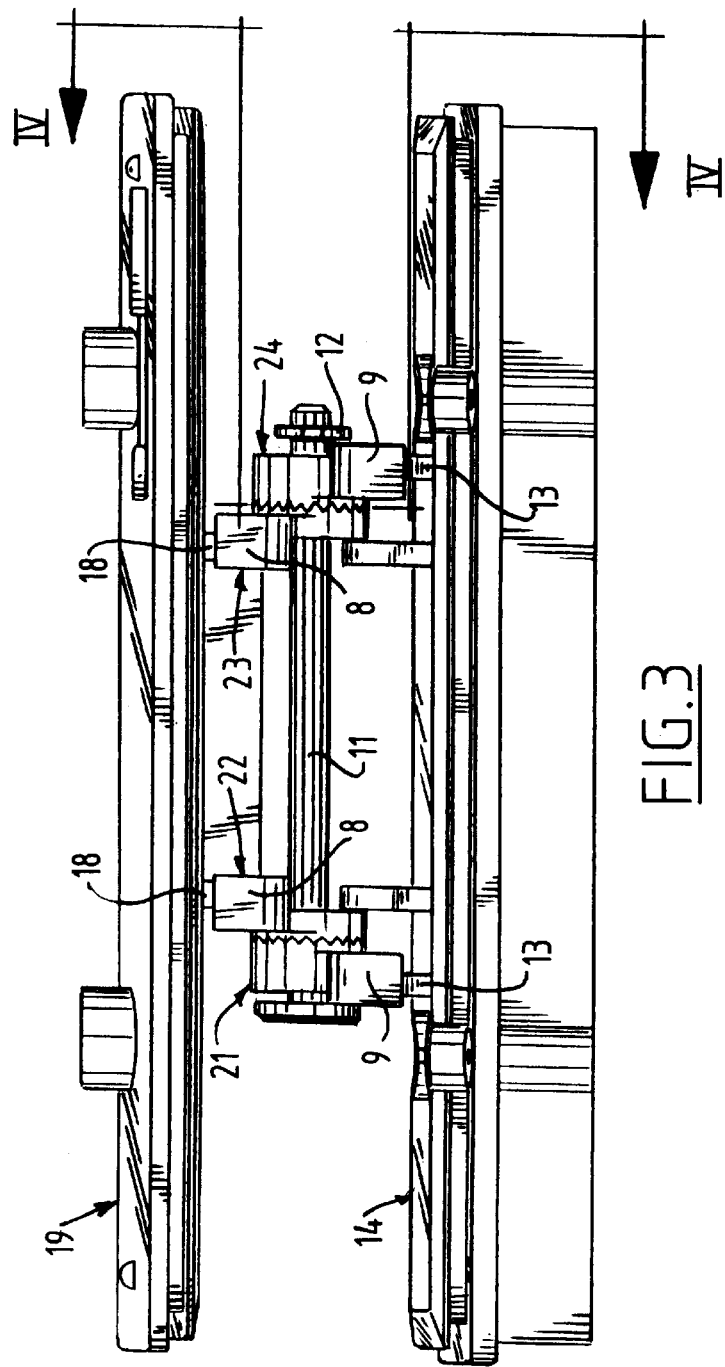
FIG. 3 shows a partly broken away view in more detail of the device of FIGS. 1 and 2.

A first preferred embodiment (FIGS. 1, 2, 3, 4, 6 and 7) of the device 1 according to the present invention comprises a housing 2 in which the scanning equipment, such as a semiconductor laser and mirrors, and the electronics required for reading coded information (not shown) are accommodated. The front of the housing 2 is provided with a window 3 for passage of the laser beam as shown in FIG. 2. The device 1 is placed on a foot part 4, and in this embodiment, the foot part 4 is in the form of a forward extending plate which protrudes as far as a point beneath the furthest forward tilted position of housing 2. The housing 2 can be placed in discrete positions relative to foot part 4 using coupling means 5 which is arranged in a bellows or concertina 6 between foot part 4 and housing 2. Foot part 4 is provided on the side with a recess 7 along which a cable (not shown) for the scanning equipment can be carried away to the side, while it is also possible to carry away the cable through a hole in the base surface on which the foot part 4 is placed. The housing is shown in FIG. 1 in its position tilted furthest forward, wherein stop parts 8 lie against stop parts 9. If the device of FIG. 1 is used mainly in backward tilted positions, the foot part 4 can be placed into a position rotated through 180° shown with broken lines in order to likewise ensure the balance of the device in backward tilted position. Because of the arrangement of foot part 4, the housing 2 can be tilted at 90° from vertical in either direction without requiring that the foot part be secured to a base surface on which it is placed. Consequently, the entire structure can remain portable, providing the advantage of easier operation in a variety of locations without the necessity of using time-consuming fixing devices such as screws, clamps, etc.

The coupling means 5 (FIGS. 2, 3, 4, 6 and 7) comprise a shaft 11 provided with a locking element 12. Shaft 11 is placed through bearing elements 13 on a plate part 14 which is fixedly screwable to a connecting piece 16 using screws 15. The connecting piece 16 can be fixed to foot part 4 using screws 17. The distance of housing 2 from the base surface is determined by the choice of the connecting piece 16, that is, by the height thereof. The shaft 11 is further placed through bearing elements 18 on a bottom plate 19 of housing 2. Shaft 11 is also inserted through click elements 21, 22, 23 and 24 onto which the respective stop parts 8 and 9 are moulded and which also comprise pinions with toothings which are mutually engaging. When the housing 2 is tilted forward or backward the pinions click into each other, each time for instance after tilting through an angle of 15°.

As shown particularly in FIG. 2, the components 4, 16, 14 and 19 are provided with recesses placed one above the other for passage of the wiring (not shown). The components 4, 16, 14, 21–24 and 19 are preferably manufactured from injection moulded plastic.

Figure 5:
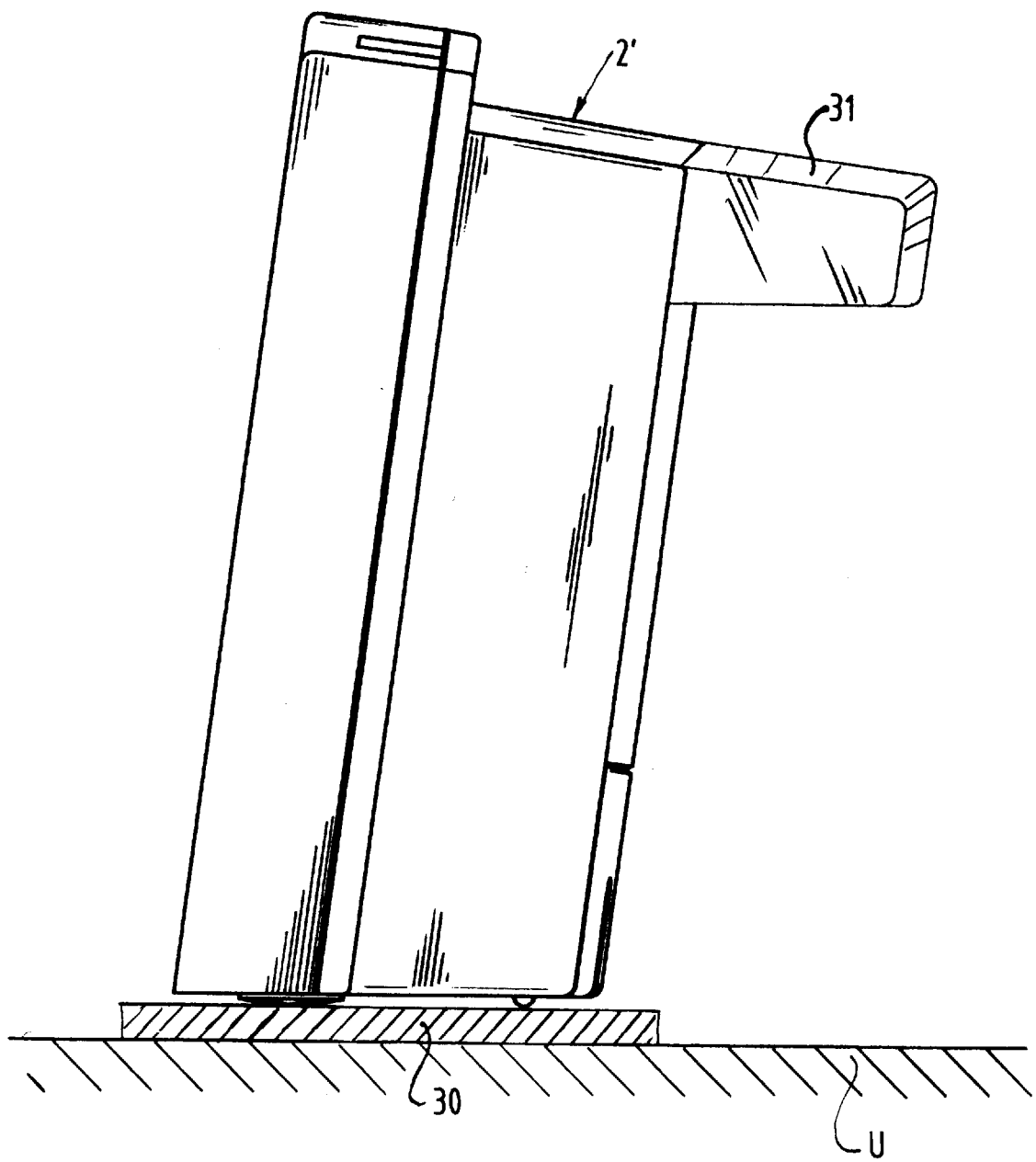
FIG. 5 shows a side view of a second preferred embodiment of the device according to the present invention.

In a second preferred embodiment according to the present invention (FIG. 5) the housing 2' is detachable from a base plate 30 which can be fixed to a base surface U shaped fixture in a manner not shown. Between the underside of housing 2' and base plate 30 a snap mechanism can be arranged in a manner not shown for snapping the housing 2' onto base plate 30 in a fixed position. In the embodiment according to FIG. 5, the dimensions of which roughly correspond with the actual size of the scanner, it is therefore possible to detach housing 2 from base plate 30 and move it to an information code for scanning. In order to facilitate detachment, housing 2' is preferably provided with a handgrip 31. The cord or wire not shown in FIG. 5 can be carried through an opening in the base surface U or be located thereover to the side or rear.

In the views represented in FIGS. 6 and 7, the housing 2 of the compact scanner 1 is shown as being provided with a bottom cover plate 43 which is L shaped and which is provided with a slit 44 for the guidance of cables C1 and C2 for power supply and data transmission and which is provided with openings 45 and 46 in which rubber feet (not shown) can be disposed. The bottom cover plate 43 can be fixed by screws 47 and 48 either to a base surface such as a counter (FIG. 6) or to the coupling means 5 which are connected to the foot part 4 (FIG. 7) as described above. If, however, it is not desirable to bore holes into a base surface the cover bottom plate can be provided with rubber feet (not shown) preventing slippage of the scanner relative to the base surface.

At installation an edge 51 of the upper part of the scanner housing 2 is subsequently brought under pivoting elements 53 which are provided on the cover plate 43, whereafter the upper housing part is pivoted in the direction of arrows A and is clicked to the bottom cover. If the upper part of the scanner housing 2 is to be detached from the bottom cover plate 43, a pin-like element, such as a screwdriver, is to be inserted in hole 54, whereafter the upper scanner housing part can be pivoted in the direction opposite to arrow A.

The rights applied for are in no way limited by the above described preferred embodiments thereof. The scope of the present invention is defined in the first instance by the following claims.

We claim:

1. A portable device for scanning and reading coded information on one or more articles, comprising:

a housing having scanning equipment contained therein and which is provided on one side with a window for passage of scanning beams, said housing including a bottom cover plate;

coupling means, disposed between said bottom cover plate and an external base surface upon which said portable device is placed in a non-fixed manner, for pivoting the housing substantially 90° in either direction from a plane perpendicular to said base surface to fix said housing at a plurality of predetermined scanning positions; and a foot part arranged to rest on said base surface without attachment to said base surface during scanning operations, said foot part comprising
   (1) a plate which protrudes in one direction to a limit point beneath a farthest position to which the housing can be tilted and,
   (2) means for selectively fixing said foot part in a first position and, alternatively, in a second position rotated through 180° relative to the first position, where in said first position said foot part points in a direction in which the housing is pivoted for use.

2. A device as claimed in claim 1, wherein the coupling means comprises click elements so that the housing can be swivelled into discrete positions toward and away from a plane perpendicular to said base surface.

3. A device as claimed in claim 2, wherein the click elements comprise at least two pinions having end sides, said end sides having teeth defined thereon.

4. A device as claimed in claim 1, further comprising a connecting piece disposed between the foot part and the coupling means.

5. A device as claimed in claim 1, wherein the bottom cover plate is an L-shaped plate.

6. A device according to claim 5, wherein the bottom cover plate is provided with pivoting elements for pivoting the housing from a first detached position to a second operating position.

7. A portable mount for a bar code scanner having a housing located in a substantially perpendicular position relative to a horizontally extending foot part, the housing having scanning equipment contained therein, the scanning equipment generating a scan pattern projected through a window in the housing, said portable mount comprising:

a coupler attaching the housing to the horizontally extending foot part, said coupler allowing the housing to be pivoted substantially 90° in either direction of a plane perpendicular to the horizontally extending foot part to fix said housing at a plurality of predetermined scanning positions; and said foot part arranged to rest on an external base surface upon which said portable mount unit is placed without attachment during scanning operations, said foot part comprising
   (1) a plate which protrudes in one direction to a limit point beneath a farthest position to which the housing can be tilted, and
   (2) means for selectively fixing said foot part in a first position, and alternatively, in a second position rotated through 180° relative to the first position, where in said first position said foot part points in a direction in which the housing is pivoted for use.

8. The mount of claim 7 wherein said coupler comprises:

a first plate attached to the housing;

a first pair of bearing elements attached to said first plate;

a second plate coupled to said horizontally extending foot part;

a second pair of bearing elements attached to said second plate; and a shaft placed through said first and said second pairs of bearing elements allowing said first and second plates to be pivoted relative to each other about said shaft.

9. The mount of claim 8 further comprising a pinion having teeth mounted on said shaft.

10. The mount of claim 9 further comprising a stop member attached to said first plate allowing movement of said pinion through a predetermined rotational angle.

11. The mount of claim 9 further comprising a stop member attached to said second plate allowing movement of said pinion through a predetermined rotational angle.

12. The mount of claim 8 further comprising a flexible bellows fit over said first plate and said second plate.

13. The mount of claim 8 wherein the housing is detachable from said coupler.

* * * * *